United States Patent [19]

Simonsen

[11] Patent Number: 5,400,469
[45] Date of Patent: Mar. 28, 1995

[54] LEVER ACTION CASTER WITH SHOCK ABSORBING SPRING

[75] Inventor: Robert J. Simonsen, Evansville, Ind.

[73] Assignee: FKI Industries, Inc., Fairfield, Conn.

[21] Appl. No.: 52,100

[22] Filed: Apr. 22, 1993

[51] Int. Cl.6 .............................................. B60B 33/00
[52] U.S. Cl. .................................................. 16/44; 16/20
[58] Field of Search ........................................ 16/44, 20

[56] References Cited

U.S. PATENT DOCUMENTS

| | | | |
|---|---|---|---|
| 2,040,121 | 5/1936 | Bowen | 16/44 |
| 2,442,831 | 6/1948 | Suttles | 16/44 |
| 2,707,795 | 5/1955 | Skupas | 16/44 |
| 4,462,138 | 7/1984 | Black | 16/44 |
| 4,485,521 | 12/1984 | Welsch et al. | 16/44 |
| 4,559,669 | 12/1985 | Bonzer et al. | 16/44 |
| 4,575,896 | 3/1986 | Nakao et al. | 16/35 R |
| 4,685,174 | 8/1987 | Hager | 16/44 |
| 4,763,910 | 8/1988 | Brandli et al. | 16/44 |
| 4,923,346 | 5/1990 | Hager | 16/44 |
| 5,347,680 | 9/1994 | Rippe | 16/44 |

FOREIGN PATENT DOCUMENTS

| | | | |
|---|---|---|---|
| 852602 | 2/1940 | France | 16/44 |
| 2399328 | 3/1979 | France | 16/44 |

*Primary Examiner*—Lowell A. Larson
*Assistant Examiner*—Donald M. Gurley
*Attorney, Agent, or Firm*—Woodard, Emhardt, Naughton Moriarty & McNett

[57] ABSTRACT

The legs of a swivel caster assembly horn are mounted to a pair of horizontally-spaced beam plates which are pivoted to the legs ahead of the swivel axis. The caster wheel is mounted on an axle behind the swivel axis. A pair of urethane springs is mounted to the horn legs ahead of the pivot axis. A bolt across the front ends of the beams receives collars, each collar having a threaded transverse aperture which is screwed onto threads on the lower ends of bolts whose upper ends have heads with flanges which bear downward on a spring cap plate bearing downward on the tops of the springs, whereby the load on the caster horn is applied by lever action to the springs which are pre-loaded by the collars screwed onto the bolts.

10 Claims, 2 Drawing Sheets

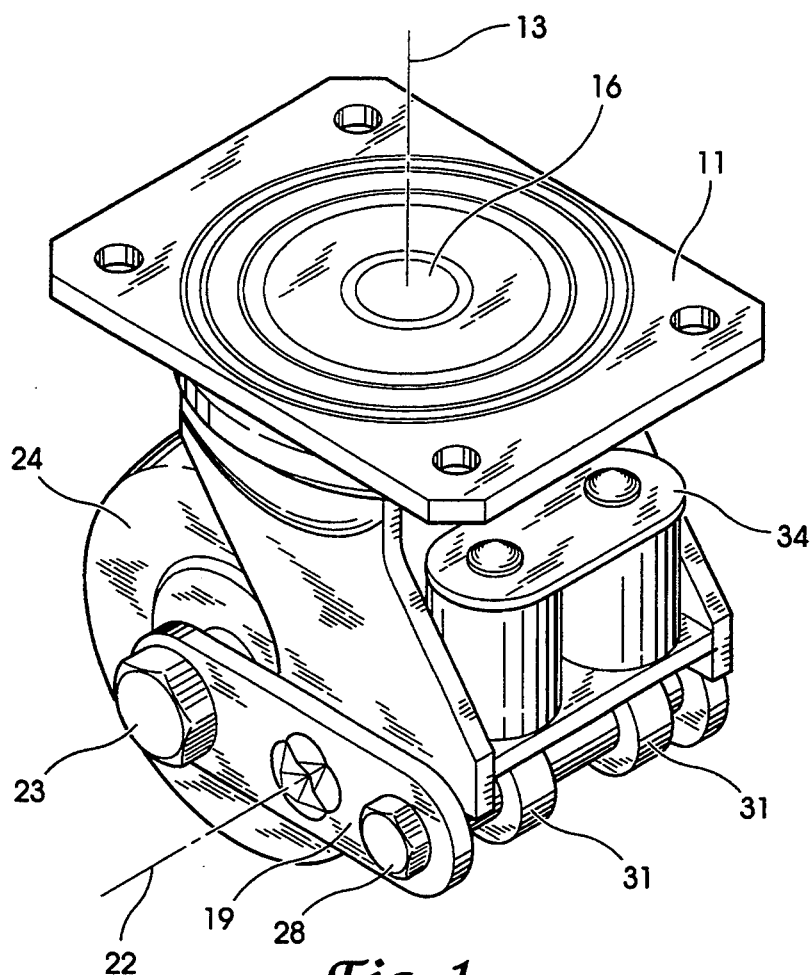
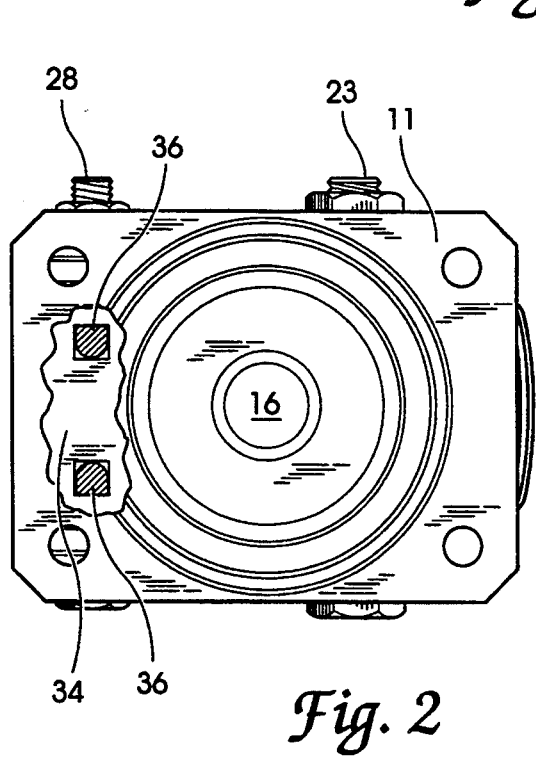
Fig. 2
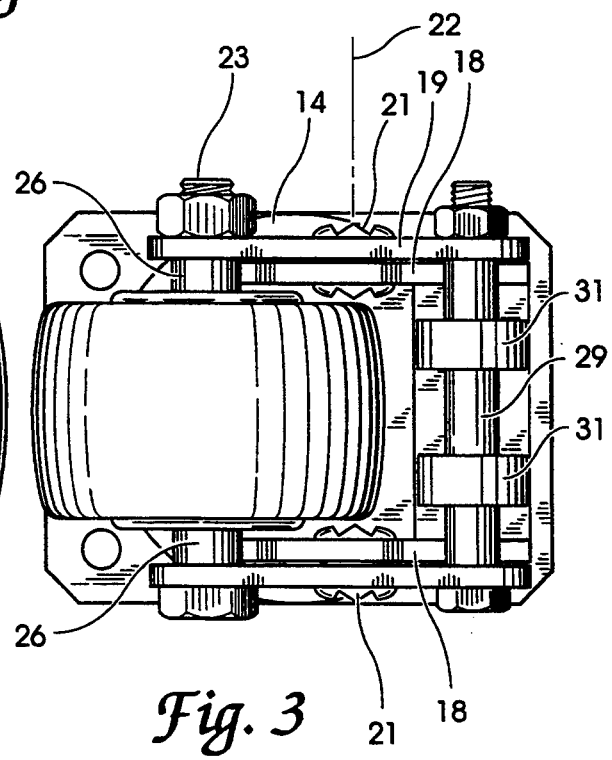
Fig. 3

LEVER ACTION CASTER WITH SHOCK ABSORBING SPRING

BACKGROUND OF THE INVENTION

1. Field of the Invention

This invention relates generally to caster wheels for support of cabinets, carts, dollies and the like.

2. Description of the Prior Art

Casters have been used for a great many years to support furniture and other items in a way whereby they can be conveniently moved. In the use of casters, it has been found desirable in some instances, to use springs in the casters to support the loads in a somewhat resilient manner. This can make it easier to move the item supported by the caster and to accommodate irregularities in the surface on which the item is supported or along which it is moved. In addition, the use of springs enables less jostling of the item supported on the casters.

There are situations in which a caster which employs metal springs can be caused to oscillate undesirably. An example is where a set of casters supports a cart or cabinet or furniture that is being transported on or in a vehicle. To address one or more of these problems, various efforts have been made and some have resulted in issuance of patents employing various types of vibration damping systems. Examples are as follows:

| U.S. Pat. No. | Inventor | Date Issued |
| --- | --- | --- |
| 2,442,831 | Suttles | 6/08/48 |
| 4,485,521 | Welsch et al. | 12/04/84 |
| 4,559,669 | Bonzer et al. | 12/24/85 |
| 4,575,896 | Nakao et al. | 3/18/86 |
| 4,685,174 | Hager | 8/11/87 |
| 77 23790 (French) | Hervieu | 8/02/77 |

These efforts notwithstanding, there has remained the need for a caster assembly having the spring and shock absorbing features, well adapted to high volume production, easily adjusted to provide the desired preloading for capacity, and wherein the springs can be easily replaced if and when needed. The present invention is directed to meeting these needs.

SUMMARY OF THE INVENTION

Described briefly, according to a typical embodiment of the invention, the caster assembly mounts a beam to the lower portion of a leg extending downward from the part by which the caster assembly is connected to a cart or whatever it is intended to support. A wheel is mounted to the rear end of the beam. An elastomeric spring is associated with the front end of the beam and the leg, the beam being pivotally mounted to the leg between the wheel rotational axis and the spring. An adjustable fastener is used to connect the spring to the leg and the beam and, being adjustable, enables preloading the spring as desired.

BRIEF DESCRIPTION OF THE DRAWINGS

FIG. 1 is a pictorial view of the caster assembly.
FIG. 2 is a top plan view.
FIG. 3 is a bottom plan view.

DESCRIPTION OF THE PREFERRED EMBODIMENT

Figure 4:
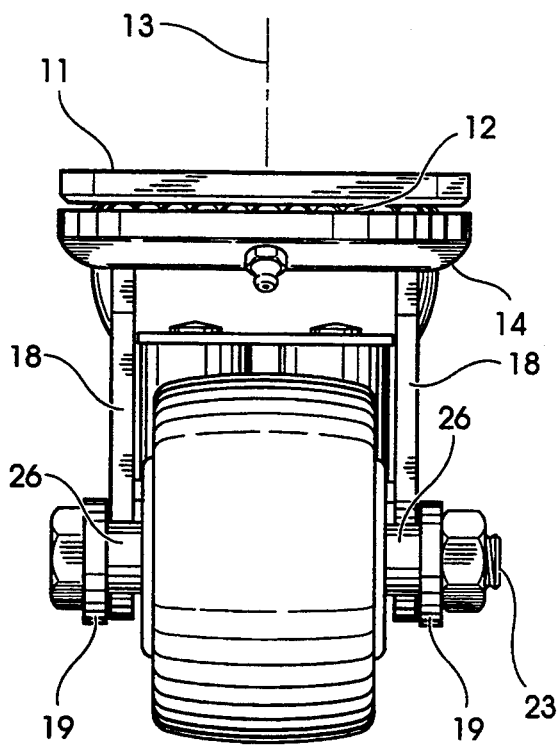
FIG. 4 is a rear elevational view.
Figure 5:
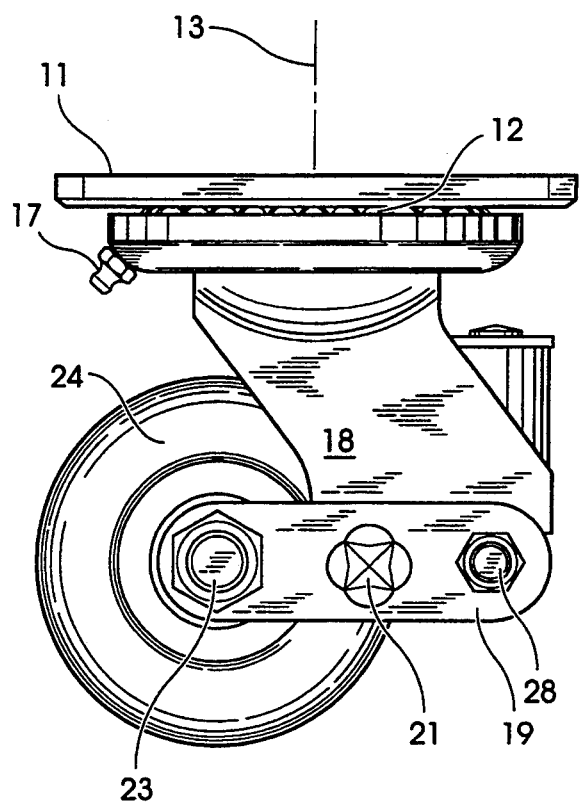
FIG. 5 is a side elevational view.
Figure 6:
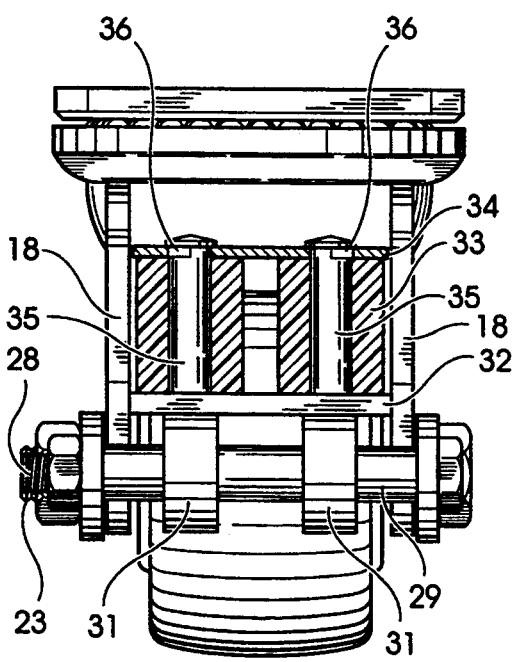
FIG. 6 is a front elevational view of the caster assembly but with the urethane springs shown in vertical section.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to the drawings in detail, the caster assembly includes a mounting plate 11 with four holes for attachment by bolts or the like to the bottom of a piece of furniture, a utility cart or the like. The mounting plate has a downwardly opening groove serving as an upper race for a series of bearing balls 12 in circular array around a swivel axis 13, with the cup 14 providing the lower bearing race. The mounting plate and cup 14 may be secured together by a rivet 16 to provide a permanent bearing assembly for which a grease fitting 17 is provided. Two downwardly projecting legs 18 affixed by welding, staking or otherwise to the cup 14 cooperate therewith to provide a swiveling caster horn assembly.

A horizontally extending plate 19 is pivotally mounted to the bottom of each of the legs 18 by a rivet 21 passing through both the plate and the horn leg 18, each rivet having permanently upset heads at the outside of the plate 19 and inside of the leg 18, as shown in FIG. 3, but fitted loose enough to serve as a pivot pin. The pivot axes of the two rivets 21 are along a line 22 that is in front of the rotational axis 13 of the swivel bearing assembly. The mounting bolt 23 for the caster wheel 24 is behind the swivel axis and extends across the space between the two plates 19 and receives a spanner sleeve (not shown) thereon. The wheel bearing is mounted on the spanner sleeve and is centered by the spacers 26 between each side of the wheel bearing and the side plates 19.

Figure 7:
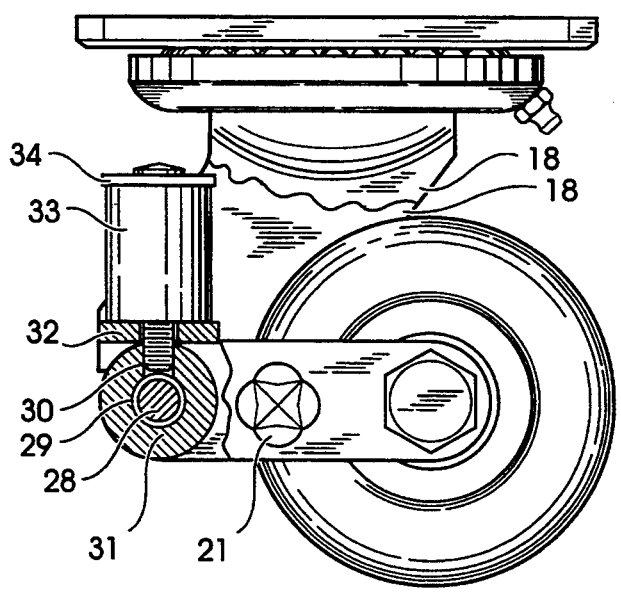
FIG. 7 is a side elevational view showing the horn fragmentarily and the spring base and anchor shaft in section to illustrate in more detail, the connection of the spring fastener to the anchor rod.

An anchor bolt 28 whose axis is parallel to those of the rivets and wheel axle bolt 23 is mounted through apertures near the front ends of the plates 19. This bolt likewise has a spanner 29 received on it and which receives the collars 31 on it. Each of these collars has a threaded aperture 30 (FIG. 7) which extends radially outward from the spanner-receiving central aperture of the collar. For each collar 31, its aperture 30 is aligned with an aperture through a bar 32 which can be staked or preferably welded to the front portions of the two horns 18. This bar 32 provides shelf which serves as a seat for a pair of urethane spring cylinders 33 through each of which a cold-formed "D" headed bolt 35 extends. A cap plate 34 rests on top of the spring cylinders and has a pair of square holes in which the part-rectangular "D" portion 36 on each of the boltheads, resides. In FIG. 2 a portion of the swivel assembly is broken out and the flanged top portion of the boltheads is omitted, showing the two corners of the head portion blending into the round shaft portion of the "D". The two corners fitting in the square hole prevent the bolt 35 from rotating in the cap plate 34. The lower end of the bolt is threaded to receive the threaded transverse aperture 30 of the collar thereon. Thus, the collar serves as a nut. Before the anchor bolt and spanner sleeve 28, 29 are installed, the bolts 35, cap plate 34 and spring cylinders 33 are assembled, and the spring cylinders are mounted on shelf 32 already welded to horn legs 18. Then the collars are screwed onto the lower ends of the bolts 35 to the upper end of the bolt thread, i.e. to where the thread stops, whereupon the collar stops. During this operation, the collars engage the bar 32 and begin to compress the springs. The length of the bolt from head flange to upper end of thread, the thickness of the cap plate 34 and the thickness of the shelf 32 and the length of spring are predetermined so that when the collar stops at the upper end of the bolt thread, the bearing of the collars on the bottom of shelf 32 provides a certain minimum desired factory pre-load on the springs. An example is 300 pounds. Thus, each such caster assembly is able to resiliently resist loading on the springs during use in a range of 300 to 1200 pounds, for example.

The shock absorbing springs employed according to the present invention are typically made of solid urethane material. As stated above, the initial pre-load desired is achieved by screwing the collars onto the bolts to where the bolt threads stop. This is near enough to the lower ends of the bolts, and the depth of the radial threaded apertures 30 in the collars is great enough that the collar will stop before the end of the bolt 35 enters the central aperture of the collar. The collars can be backed off ½ turn or less if needed to align their sleeve receiving apertures for installation of the spanner sleeve 29 and anchor bolt 28. This construction makes it possible to readily change, during mass production, from one pre-load and/or spring rate for one run of casters to a different pre-load and/or spring rate for another run of casters, by simply using different cap plate thickness, bolt head-to-thread length, or different sizes or compositions of the springs, whichever is easiest. Also, if a spring becomes damaged during use, it can be removed and replaced easily.

The plates 19 serve as beams whereby the invention uses lever action to apply the caster load from the horn fulcrum rivets to the wheel behind the fulcrum and to the spring in front of it. The spacing from the beam pivot axis to the wheel axle and to the anchor bolt 28 can be identical, but will usually be slightly greater from the pivot axis to the wheel axis, depending on desired wheel diameter and clearance.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A caster assembly comprising:
   a mounting member mountable to an article to be supported by the caster assembly;
   a leg extending downward from the mounting member;
   a beam having a front end and a rear end and pivotally mounted to the leg near the lower end of the leg for pivoting on a pivot axis between the ends of the beam;
   a wheel mounted to the beam for rotation on a second axis located behind the pivot axis;
   an elastomeric spring mounted to the leg and located and connected to the beam ahead of the pivot axis and normally limiting the pivoting of the beam relative to the leg for resiliently supporting a load placed on the mounting member;
   a spring support base under the spring and fixed to the leg;
   a fastener having a shaft extending through the base and through the spring;
   a spring cap on top of the spring, the fastener shaft extending through the cap; and
   a mating fastener on the shaft, one of the fasteners being connected to the cap and the other to the beam such as to be capable of being tightened on the shaft to place a pre-lad on the spring fastener.

2. The assembly of claim 1 and further comprising:
   a connector shaft on the beam ahead of the pivot axis and extending through one of the fasteners at a location ahead of the pivot axis, the one fastener being attached to the connector shaft below the spring base.

3. A caster assembly comprising:
   a mounting member mountable to an article to be supported by the caster assembly;
   a leg extending downward from the mounting member;
   a beam having a front end and a rear end and pivotally mounted to the leg near the lower end of the leg for pivoting on a pivot axis between the ends of the beam;
   a wheel mounted to the beam for rotation on a second axis located behind the pivot axis;
   an elastomeric spring mounted to the leg and located and connected to the beam ahead of the pivot axis and normally limiting the pivoting of the beam relative to the leg for resiliently supporting a load placed on the mounting member;
   a second leg and a bridge cooperating with the first leg to form a caster horn having two horizontally spaced legs, the horn being swivel-connected to the mounting member and thereby enabled to swivel on the mounting member about a swivel axis;
   a second beam having ends and pivotally mounted to the second leg near the lower end of the leg for pivoting about a pivot axis which is between the ends of the second beam and is collinear with the pivot axis of the first beam, the wheel being mounted to an axle mounted to the beams for rotation on the second axis, the second axis being located behind the swivel axis;
   the beam pivot axis being ahead of the swivel axis and parallel to the second axis;
   the elastomeric spring being located between the legs of the horn and located ahead of the pivot axis and normally limiting the pivoting of the beams relative to the horn for resiliently supporting a load placed on the mounting member;
   a spring support base fixed to the legs and supporting the spring;
   a threaded fastener having a shaft extending through the base and through the spring;
   a spring cap on top of the spring, the fastener shaft having a head with a flange portion on top of the cap and a part-rectangular portion in a rectangular aperture in the cap to prevent the shaft from turning relative to the cap; and a second threaded fastener connected to the other ends of the beams threaded on the shaft and adapted to be tightened against the base to place a pre-load on the spring.

4. The assembly of claim 3 and further comprising:

a second spring mounted on the base;

a third threaded fastener having a shaft extending through the base and through the second spring and through the cap; and a fourth threaded fastener connected to the other end of the beams and threaded onto the shaft of the third fastener and tightened against the base to place a pre-load on the second spring.

5. The assembly of claim 4 and further comprising:

a connector spanning the space between the beams ahead of the pivot axis, the second and fourth fasteners being attached to the connector below the spring base.

6. The assembly of claim 5 and wherein:

the connector is a round rod extending through each of the two beams and under the spring base and across the space between the beams;

the rod having a longitudinal axis parallel to the beam pivot axis and the wheel axis;

the second and fourth fasteners being collars received around the rod and thereby connected to the rod.

7. The assembly of claim 6 and wherein the rod is a bolt.

8. The assembly of claim 6 and wherein each of the collars has an aperture receiving the rod through it, and each of the collars has a threaded aperture extending radially outward from the rod-receiving aperture and which is threaded onto the threaded fastener shaft.

9. A caster assembly comprising:

a mounting member mountable to an article to be supported by the caster assembly;

a leg extending downward from the mounting member;

a beam having a front end and a rear end and pivotally mounted to the leg near the lower end of the leg for pivoting on a pivot axis between the ends of the beam;

a wheel mounted to the beam for rotation on a second axis located behind the pivot axis between the ends of the beam;

an elastomeric spring mounted to the leg and located and connected to the beam ahead of the pivot axis and normally limiting the pivoting of the beam relative to the leg for resiliently supporting a load placed on the mounting member;

a second leg and a bridge cooperating with the first leg to form a caster horn having two horizontally spaced legs, the horn being swivel-connected to the mounting member and thereby enabled to swivel on the mounting member about a swivel axis;

a second beam having ends and pivotally mounted to the second leg near the lower end of the leg for pivoting about a pivot axis which is between the ends of the second beam and is collinear with the pivot axis of the first mentioned beam, the wheel being mounted to an axle mounted to the beams for rotation on the second axis, the second axis being located behind the swivel axis;

the beam pivot axis being ahead of the swivel axis and parallel to the second axis;

the elastomeric spring being located between the legs and located ahead of the pivot axis and normally limiting the pivoting of the beams relative to the horn for resiliently supporting a load placed on the mounting member;

a spring support base fixed to the legs and supporting the spring;

first and second fasteners threaded together and having shaft means extending through the base and the spring, and the fasteners having means bearing on the spring and on the base and connecting means connecting one of the fasteners to the beams, the fasteners being rotatable relative to each other to place the spring in compression.

10. The assembly of claim 9 and wherein:

one of the fasteners has an aperture through it, and the connecting means is a third fastener which extends through the aperture and is secured to the beam ahead of the pivot axis whereby the spring is connected to the beam.

* * * * *